Sept. 11, 1951  W. H. SILVER ET AL  2,567,738

TOOL BAR SUPPORT FOR IMPLEMENTS

Filed Sept. 26, 1949

INVENTORS.
WALTER H. SILVER
WILLIAM V. LOHRMAN
BY
ATTORNEYS

Patented Sept. 11, 1951

2,567,738

UNITED STATES PATENT OFFICE 2,567,738

TOOL BAR SUPPORT FOR IMPLEMENTS

Walter H. Silver, Moline, Ill., and William V. Lohrman, Davenport, Iowa, assignors to Deere & Company, Moline, Ill., a corporation of Illinois Application September 26, 1949, Serial No. 117,902

6 Claims. (Cl. 97—47)

1

The present invention relates generally to agricultural machines and more particularly to integral or tractor mounted implements.

The object and general nature of the present invention is the provision of a new and improved integral implement which not only may be attached easily and quickly, and detached from its supporting tractor with equal facility, but also which is especially constructed to secure flexibility whereby the passage of the tractor over uneven ground does not cause undesirable or excessive variations in the operating depth of the tools.

More particularly, it is a feature of the present invention to provide a tool bar implement having means whereby the implement may readily be attached to and detached from the vertically swingable drawbar member of a tractor or the like and in which means is provided, preferably associated with the tractor drawbar, for limiting the relative movement between the tool bar and the tractor drawbar.

These and other objects and advantages of the present invention will be apparent to those skilled in the art after a consideration of the following detailed description, taken in conjunction with the accompanying drawings, in which.

Figures 1, 2, 3:
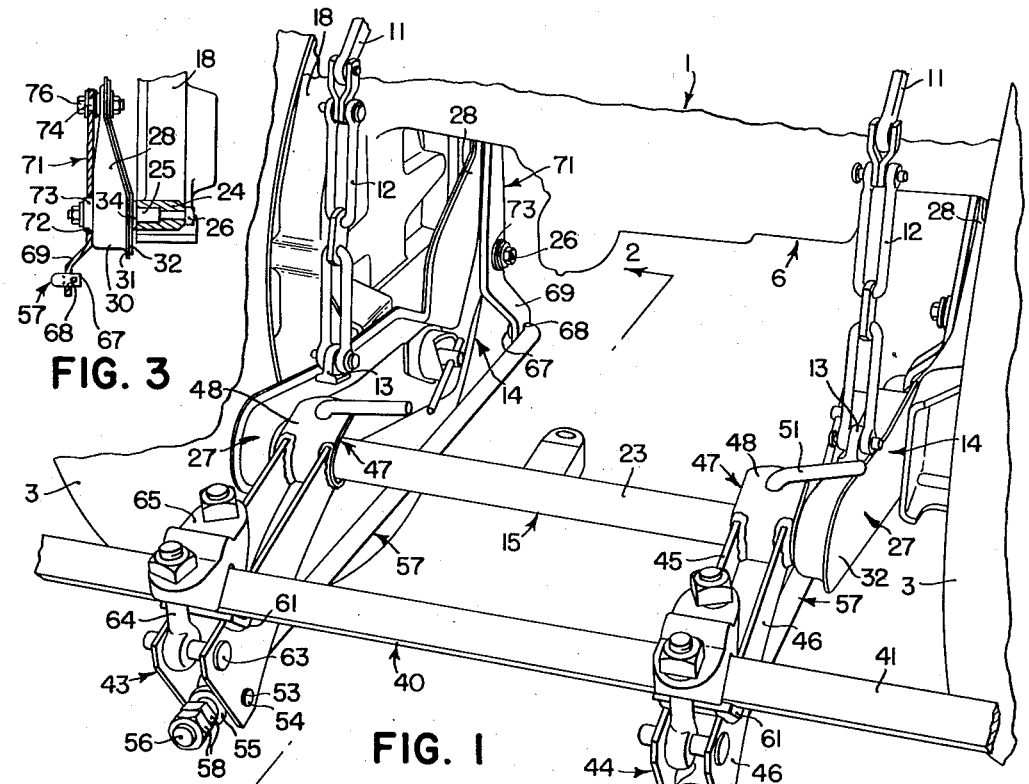
Figure 1 is a perspective view of the rear portion of an integral or tractor-mounted implement in which the principles of the present invention have been incorporated.
Figure 2 is a side view of the implement shown in Figure 1, being a sectional view taken generally along the line 2—2 of Figure 1.
Figure 3 is a sectional view taken generally along the line 3—3 of Figure 2.

Referring now to the drawings, particularly Figures 1 and 2, the reference numeral 1 indicates a farm tractor of the four-wheel type, having front wheels (not shown) and rear wheels 3 journaled for rotation on axle shafts 5 carried by a rear axle 6. The tractor includes a power plant and a power lift unit of the hydraulic type, including operating means, such as a pair of lift arms 11 and links 12 connecting the arms 11 with lugs 13 formed on the side members 14 of a generally vertically swingable tractor drawbar or bail member 15. The latter is preferably in the form of a U-shaped member, considered as a whole, and includes a transverse bar 23 connecting the two side members 14. The drawbar or bail member 15 is mounted underneath the tractor frame at the forward portions 24 of drop housings 18, which form a part of the tractor rear axle structure 6, by means of coaxially disposed hollow pivot studs or gudgeons 25 (Figure 3) carried by the lower forward portions of the drop housings 18 by means of bolts 26. Each side member 14 is formed in the shape of a bell crank having a rearwardly extending arm portion 27, to which portions the transverse bar 23 is fixed, and an upwardly extending arm 28. As best shown in Figure 3, each side member 14 comprises a pressed metal channel-shaped body 30 having outwardly turned flanges 31 and a backing plate 32 welded to the flanges to form a hollow structure. A horizontally disposed cylindrical bearing sleeve 34 passes through the forward portion of each of the side members 14. Each bearing sleeve passes through holes punched in the associated channel-shaped body 30 and the backing plate 32, and after the bearing sleeves are placed in the holes with ends projecting on either side, the extended ends of the bearing sleeves are then upset to clamp the bearing sleeves in the side members. The two bearing sleeves 34 receive the pivot studs 25 for swingably connecting the drawbar 15 to the drop housings 18. The present invention is not particularly concerned with the details per se of the tractor drawbar or bail 15.

Referring first to Figure 1, the implement with which the present invention is more particularly concerned is indicated in its entirety by the reference numeral 40 and comprises a transversely disposed square tool bar 41 to which any suitable number of a variety of implement or tool units may be connected, such as cultivator teeth, lister bottoms and the like. Fixed to the tool bar 41 at laterally spaced points are two attaching brackets 43 and 44. These brackets are substantially identical and hence a description of one will suffice. Each bracket comprises a pair of spaced apart complementary triangular plates 45 and 46, welded at their forward ends to a U-shaped socket member 47 which includes upper and lower apertured lugs 48 and 49 which form a generally forwardly facing socket 50 adapted to snugly embrace the transverse member 23 of the tractor drawbar 15. A pin 51 is disposed in the apertures in the lugs 48 and 49 and serves to hold the U-shaped socket members 47 engaged over the bar 23. The rear portions of the plates 45 and 46 are extended and apertured at upper and lower portions, the lower apertures 53 receiving the trunnions 54 of a swivelly mounted sleeve 55 through which the threaded end 56 of an anchoring link 57 extends. The threaded end 56 carries a pair of lock nuts 58, and forward of the associated sleeve 55 each of the anchoring links 57 carries an abutment collar 59 welded or otherwise fixed thereto.

The upper rear portions of each pair of bracket plates 45 and 46 are notched to receive a V-shaped upwardly facing socket member 61 which is welded to the plates 45 and 46 and cooperates with the associated U-shaped forward members 47 to hold the plates 45 and 46 in spaced apart relation. The V-shaped socket members 61 receive the tool bar 41. The rear upper portions of each pair of plates 45 and 46 are apertured to receive a pair of pins 63 upon which eyebolts 64 are mounted. The upper portions of the eyebolts 64 pass through a clamping cap 65 shaped to embrace the upper portion of the square tool bar 41. When the eyebolts 64 are tightened, the two brackets 43 and 44 are rigidly fixed to the tool bar 41, and preferably the arrangement is such that the brackets 43 are spaced apart a distance such that they lie contiguously on the inside of the side arm portions 14 of the tractor drawbar 15, whereby lateral displacement of the implement 40 relative to the tractor drawbar bail 15 is prevented.

The forward end of each of the anchoring links 57 is turned outwardly, as at 67, and inserted in the opening 68 in a laterally inwardly bent portion 69 of an anchoring bracket 71. The latter has a centrally apertured portion 72 which is adapted to fit over a bearing ring 73 on the inner end of the bearing bushing 34 of the tractor drawbar arm member 14, and the upper end of each bracket 71 is apertured to receive the inner projecting portion of an upper bearing sleeve 74, which is held in an eyelet in the upper end of the associated bail arm 28 by a bolt 76 or the like. Each bolt 76 is tightened so as to hold the associated bracket 71 in position on the bail arm 28.

In operation, the lock nuts 58 are so adjusted on the anchoring links 57 that there may be spaces $S^1$ and $S^2$ between the ends of the bushing 55 and the nuts 58 and collars 59, thereby providing sufficient lost motion so that the tool bar 46 and its supporting brackets 44 may swing relative to the tractor drawbar 15 through a relatively short distance. Such distance is, however, sufficient to provide the desired amount of flexibility between the tools fixed to the drawbar 41 and the tractor drawbar 15 whereby movement of the latter relative to the tools, as when passing over uneven terrain, has little effect on the tools fixed to the bar 41. However, when the tractor power lift mechanism is actuated to raise the drawbar 15, the implement 40 is also raised with the drawbar after the lost motion, provided at the rear ends of the stabilizing rods 57 as just described, has been taken up.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. In an agricultural implement of the type adapted to be mounted on a tractor having a drawbar bail vertically shiftable at the rear of the tractor and including side arm portions pivoted to the tractor and a rear transverse part, and in which said implement includes a transversely disposed tool-receiving bar: the improvement comprising a pair of brackets, each having a part-receiving socket facing in a generally fore and aft direction and a generally upwardly facing bar-receiving socket at the upper rear portion of the bracket, means for fixing said tool-receiving bar to said brackets in the bar-receiving sockets thereof, a sleeve swiveled in each bracket generally below the bar-receiving socket thereof, a stabilizing link disposed in each sleeve, stop means on the rear end of each link acting against the associated sleeve for limiting the pivotal movement of the implement on said drawbar bail, and means connected with the forward end of said link for connecting the latter with the tractor.

2. An agricultural implement adapted to be mounted on a tractor having a rear generally vertically swingable drawbar bail including a transverse section and a pair of side arm sections supporting said transverse section and swingably connected with the tractor, said implement comprising a transverse tool-receiving bar, a pair of U-shaped parts, including forwardly facing drawbar-receiving sockets, connected in laterally spaced apart relation to said tool-receiving bar, a stabilizing member pivotally connected at its rear end with each of said parts and extending forwardly therefrom, and means for connecting the forward end of each of said stabilizing members with the side arm sections of said drawbar bail.

3. An agricultural implement adapted to be mounted on a tractor having a rear generally vertically swingable drawbar bail including a transverse section and a pair of side arm sections supporting said transverse section and swingably connected with the tractor, said implement comprising a transverse tool-receiving bar, a pair of brackets, each including a U-shaped, generally forwardly facing socket, adapted to be pivotally connected in laterally spaced apart relation to said transverse bail section, means carried by said brackets for holding said sockets in pivotal connection with the transverse section of said tractor drawbar bail, a stabilizing member connected at its rear end for both pivotal and limited linear movements with each of said brackets and extending forwardly therefrom, and means for connecting the forward end of each stabilizing member with the drawbar bail.

4. An agricultural implement of the type adapted to be mounted on a tractor having a drawbar bail vertically shiftable at the rear of the tractor and including a rear transverse part, said implement including a transverse tool-receiving bar, a pair of brackets, each having a part-receiving socket facing in a generally fore and aft direction, fixed to said tool bar, means for holding said sockets on the transverse part of said drawbar bail whereby said brackets and said tool-receiving bar may pivot about said part, a pair of link-receiving brackets adapted to be fixed to said side arm portions of the tractor drawbar bail, and a pair of stabilizing links connectible between said tool-bar-receiving brackets and said link-receiving brackets for limiting the pivotal movement of the implement on said drawbar bail.

5. An agricultural implement of the type adapted to be mounted on a tractor having a drawbar bail vertically shiftable at the rear of the tractor and including side arm portions pivoted to the tractor, a rear transverse part connected to the rear ends of said side arm portions, and upwardly extending arms at the forward ends of said side arm portions, said implement including a transverse tool-receiving bar, a pair of brackets fixed to said tool bar in spaced apart relation, each of said brackets having a generally forwardly extending socket adapted to receive the rear transverse part of said tractor drawbar bail, means for holding said sockets on said transverse bail part whereby said brackets and said tool-receiving bar may pivot about said part, a pair of link-receiving brackets adapted to be fixed to said upwardly extending drawbar arms, and a pair of stabilizing links, each having a lost-motion connection at its rear end with the associated tool-bar-receiving bracket, connectible between said tool-bar-receiving brackets and said link-receiving brackets for limiting the pivotal movement of the implement on said drawbar bail.

6. An agricultural implement of the type adapted to be mounted on a tractor having a drawbar bail vertically shiftable at the rear of the tractor and including side arm portions pivoted to the tractor and a rear transverse part, said implement including a transverse tool-receiving bar, a pair of brackets, each having a part-receiving socket facing in a generally fore and aft direction, fixed to said tool bar in spaced apart relation, means for holding said sockets on said part whereby said brackets and said tool-receiving bar may pivot about said part, link means having a lost-motion connection with said brackets, and means for connecting the forward ends of said link means with the tractor, whereby said link means serves to limit the pivotal movement of the implement on said drawbar bail.

WALTER H. SILVER.
WILLIAM V. LOHRMAN.

REFERENCES CITED

The following references are of record in the file of this patent:

UNITED STATES PATENTS

| Number | Name | Date |
|---|---|---|
| 2,030,567 | Bowen | Feb. 11, 1936 |
| 2,483,565 | Strandlund | Oct. 4, 1949 |